UNITED STATES PATENT OFFICE 2,050,639

PROCESS FOR THE BREAKING AND RE-
SOLVING OF EMULSIONS OF OIL AND
WATER

Truman B. Wayne, Houston, Tex.

No Drawing. Application July 7, 1930, Serial No.
466,360. Renewed May 24, 1935

13 Claims. (Cl. 196—4)

The present invention relates to an improved process for the breaking and resolving of emulsions of oil and water.

One of the objects of the invention is to resolve emulsions of the water-in-oil type by means of special reagents, which, by their combined hydrotropic and penetrating qualities, as well as their ability to lower the surface tension between water and water-insoluble liquids, will rapidly resolve emulsions to which they have been added.

Another object of the invention is to break or resolve emulsions by subjecting the same to the action of organic substances which may broadly be defined as consisting of condensation products of alkyl and aryl nuclear substitution products of aromatic hydrocarbons and of their hydrogenated derivatives with organic bases.

A further object of the present invention is to cause the resolution of water-in-oil emulsions in which the water exists in the disperse phase in a continuous phase of oil, by means of substances of the group hereinabove mentioned, which by being soluble in the oil phase as well as in the water phase of the emulsion, are capable of reaching the disperse water phase and by their hydrotropic effect and their ability to change the surface tension phenomena between the disperse water phase and the continuous oil phase will cause an aggregation of the disperse water phase into a continuous water phase, which, under the influence of gravity, will bring about subsidence and stratification, whereby the emulsion becomes resolved into an individual water phase, and a supernatant substantially water-free oil phase.

Other objects of the invention will appear from the detailed description and claims hereinbelow.

In order that a proper understanding of the function and operation of the reagents which are used in carrying out the present invention may be had, a general concise discussion of the nature of the emulsions that it is desired to treat and resolve is advisable.

The emulsions of oil and water are capable of existing in two distinct sharply differentiated types. The basic phenomena involved in both types, however, are the same.

The first type is an emulsion of oil in water usually termed an "oil-in-water" emulsion. Such an emulsion consists of individual droplets of oil which are dispersed as individuals in a continuous phase of water. An emulsion of the oil-in-water type usually results when the surface tension of the water has been lowered by the addition of soapy or foam-producing materials, particularly by the presence of water-soluble sodium soaps.

On the other hand, water-insoluble soaps such as calcium soaps, will cause the formation of the second type of emulsion, viz: "water-in-oil" type. This second type consists of individual droplets of water dispersed in a continuous phase of oil. This type is usually promoted by the presence of substances which lower the surface tension of the oil instead of the water. Either type of emulsion may usually be converted into the opposite type by changing the surface tension and interfacial characteristics of the oil and water. This may be summed up by stating that emulsions of the oil-in-water type are promoted by the presence of water-soluble colloids, which are generally termed, in this art, hydrophile colloids.

The emulsions of the water-in-oil type on the contrary are caused and stabilized by oil soluble colloids, generally termed, in this art, hydrophobe colloids.

Any substance which would tend to destroy the colloid that stabilizes the emulsion will tend to resolve the emulsion or "break" it by permitting the aggregation or flowing together of the individual water or oil particles so that they thereafter form a continuous phase which will separate according to its gravity from the other phase.

Emulsions in general are believed to consist of three phases, viz: an oil phase either continuous or disperse; a water phase either continuous or disperse, and an emulsion-forming or stabilizing phase which exists at the interface between the disperse and the continuous phases of the emulsion.

It is generally accepted that the emulsion-stabilizing phase is wetted both by the oil and the water but there exists a difference in the surface tension on each side of the film that separates the phases.

By reason of this difference, the inter-facial film will be bent in such a manner that the side possessing the higher surface tension will contract and hence become concave; this contraction rapidly eventuating into a globule which envelopes the liquid on the concave side thereby rendering the said liquid thus enclosed the disperse phase.

Thus, theoretically, a given liquid "A" will be dispersed as drops in a second liquid "B" when the interfacial tension between the liquid "B" and the separating film "C" is less than the interfacial tension between the liquid "A" and film "C".

A full discussion of this theory of the formation of emulsions may be found in an article by Bancroft in the "Journal of Physical Chemistry," vol. 17, pages 514-18 (1913). Further light on these phenomena was thrown by Clowes (Journal of Physical Chemistry, vol. 20, pages 407-451 (1916)) who showed that a third substance is necessary to the formation of even temporary emulsions and that the dispersing and stabilizing effect of the film of said third substance may be due not only to the lowering of the interfacial tension between the two said phases thereby tending to oppose the coalescense of the globules, but may also additionally secure the dispersion and prevent the re-aggregation of the dispersed phase by conferring an electrical charge upon the dispersed phase whereby the individual droplets of the disperse phase, all carrying the same charge will tend to separate or repulse each other.

The phenomena is further complicated by the fact that solids may be present which wander to the interface and act as further mechanical insulating media preventing the coalescense of the disperse phase.

The electrical charges upon the individual droplets of the disperse phase have proved, and practical application has been made in a process termed "cataphoresis" which permits the plating out by an electrical current of the disperse phase, as for example in the electro-deposition of coherent rubber coatings from suspensions of latex, and the electro-deposition of cellulose or cellulose esters from emulsions of solutions of the latter in aqueous media.

With an understanding therefore of the phenomena incurred, the problems to be solved in the resolution of emulsions will be better understood.

A number of patents have been granted for processes of breaking emulsions, particularly such commercially occurring emulsions of those of water-in-oil arising from natural oil wells and also formed in the process of refining of petroleum and its products.

In general, the object of breaking these emulsions is to secure the oil in a commercially available form and the treatment of these emulsions is often referred to as "chemical dehydration."

While in many cases an emulsion of the water-in-oil type may be resolved by heating the emulsion to the boiling point of water so as to convert the disperse water phase into steam, this is not always successful because foaming takes place and the emulsions, when heated in an oil still will puke over into the receiver.

The problem is by no means a simple one and the chemicals proposed for the dehydration of oil emulsions are many. They may be roughly grouped into six groups, this classification being due to Dow as described in Bureau of Mines Bulletin 250. According to this writer, the chemicals are classified according to their effect upon the film.

While some compounds have a dual action and hence are classifiable in more than one group; the primary action of the substances is the main index of their grouping.

Group 1—Compounds with a strong tendency to take up water and form different substances.

Group 2—Compounds that cause flocculation of the substance composing the protective film.

Group 3—Compounds that may react with salts in the water or upon organic acids that may be present.

Group 4—Compounds that tend to break the protective film by their tendency to form opposite types of emulsion.

Group 5—Electrolytes that tend to neutralize the electrical charge on the surface of the emulsified water.

Group 6—Solvents that tend to dissolve the material making up the protective film.

Most of the commercially successful processes aimed at the resolution of petroleum emulsions into their component parts that is to say, oil and naturally occurring waters or brine by chemical or physical chemical methods depend mainly upon counter-colloid action. It is usual to add a colloid which has a tendency to produce emulsions of the reverse type from that which it is desired to resolve into its component parts. If the proper amount of the counter-colloid is used, the surface tension upon the film separating the two phases becomes substantially the same on one side as the other with the result that the disperse phases will aggregate and coalesce, becoming continuous and separating by stratification from the second phase.

The emulsion-breaking reagents which I employ in carrying out my present invention are prepared from alkyl and aryl nuclear substitution products of aromatic hydrocarbons and their hydrogenated derivatives, for example; carbocyclic or heterocyclic compounds of fairly high molecular weight; such as naphthalene, anthracene, and their homologues and hydrogenated derivatives and hydroxy compounds such as naphthol or similar cyclo-nuclear substances such as pyridine, quinoline, or their homologues, which are either alkylated, arylated, or cycloalkylated in the nucleus by condensation or treatment with sulphuric acid esters of the higher alcohols, the resultant products being then sulfonated. The said sulfonation may occur simultaneously with the reaction in which the nuclear substitution takes place. This may be done by subjecting the hydrocarbons themselves to substituting agents in the presence of powerful sulfonating and dehydrating agents such as oleum or chlorosulfonic acid.

The sulfonic acids of the above mentioned aromatic hydrocarbons, substituted in their nuclei as described, are all highly soluble in water and possess very great wetting and penetrating qualities. They exert a very marked hydrotropic effect and lower the surface tension between water and water-insoluble liquids. However, under the conditions met in the commercial dehydration of petroleum emulsions, they are unable to penetrate the continuous oil phase and resolve the curvature existing at the oil-water interface as the result of action of the emulsifying colloid present at this point.

I have found that condensation products of these aromatic sulfonic acids with organic bases such as oil-soluble non-hydroxy alkylamines, or with aralkylamines characterized by having the amino group or its residue in the alkyl side-chain instead of attached directly to the aromatic nucleus, are highly effective demulsifiers for petroleum emulsions. Amines of the latter type are stronger bases than aralkylamines such as toluidine whose amino group is attached directly to the aromatic nucleus, and hence resemble the more strongly basic aliphatic amines.

The sulfonic acids suitable for my purpose may be the mono-, di-, or tri-sulfonic acid of a cyclic aromatic hydrocarbon such as naphthalene or its hydrogenated, chlorinated, or other substituted form. Preferably the aromatic nucleus shall contain residues from alkyl, aralkyl, or cyclo-alkyl alcohols or other groups capable of being substituted into the aromatic nucleus. Many of the corresponding heterocyclic sulfonic acids may also be employed either alone or in admixture with sulfonic acids of the carboxylic series.

Suitable amines are the primary, secondary, and tertiary alkyl amines, preferably those whose alkyl groups contain three or more carbon atoms. These are characterized by their solubility in petroleum hydrocarbons. Some of the mono-alkyl amines are also soluble in water.

Condensation products prepared from the nuclear-substituted aromatic sulfonic acids and the non-hydroxy alkyl amines are completely soluble in petroleum hydrocarbons after being freed from dissolved water, and many of them are also completely miscible with water, forming thick, colloidal solutions. These properties clearly distinguish these new condensation products from the ordinary water-soluble, oil-insoluble salts of the substituted aromatic sulfonic acids. They possess, also, the valuable property of being precipitated in colloidally hydrated form by brines, and thus segregate at the oil-water interface in the most desirable form. The alkali metal or ammonium salts of these sulfonic acids do not possess the characteristics above mentioned, and their alkaline-earth salts either are crystalline or remain dissolved in the brine, and thus do not segregate as hydrated colloids at the oil-water interface.

These new amino derivatives of aromatic sulfonic acids may be either the substituted ammonium salt or the acyl derivative. In the latter case, substitution of one or more hydrogens attached to the tertiary or quaternary nitrogen atom is involved. Some of the more complex di-, tri-, or tetra-amines may likewise be employed, and in this case a number of acyl residues may be attached to one molecule of amine. While quite a number of these compounds may be prepared in known ways in accordance with the accepted synthetic methods of organic chemistry, it is to be understood, however, that any compound properly falling into the class of compounds claimed herein will be considered as an equivalent for the purpose of interpreting the following claims.

The reagents are employed in the proportion of from one part of the same to from four thousand to ten thousand parts of the oil emulsions, the reagents being used either as such alone or in some carrier, as for example, water, oil, alcohol, tar-acid-oil or the like.

The term "hydrotropy", as used above, is one which is applied to substances which have the property of transforming certain materials normally insoluble in water into clear watery solutions.

What it is desired to protect by Letters Patent and what I claim as my invention is:

1. The process of breaking water-in-oil emulsions which comprises adding thereto the condensation product of a cyclic sulfonic acid and an oil-soluble non-hydroxy alkyl amine, and effecting separation of the component parts of oil and water.

2. The process as claimed in claim 1 wherein the cyclic sulfonic acid is substituted in its nucleus.

3. The process as claimed in claim 1, wherein the cyclic sulfonic acid is carbocyclic.

4. The process as claimed in claim 1, wherein the cyclic sulfonic acid is a nuclear-substituted carbocyclic aromatic sulfonic acid.

5. The process of breaking water-in-oil emulsions which comprises adding thereto the condensation product of a heterocyclic sulfonic acid and an oil-soluble non-hydroxy alkyl amine, and effecting separation of the component parts of oil and water.

6. The process as claimed in claim 5 in which the heterocyclic sulfonic acid contains a substituting radical in its nucleus.

7. The process of breaking water-in-oil emulsions which comprises dissolving a condensation product of a cyclic sulfonic acid wih an oil-soluble non-hydroxy alkylamine in a solvent thereof, adding the resulting solution to the emulsion, and thereby effecting separation of the component parts of oil and water.

8. A composition for breaking water-in-oil emulsions which comprises as a component the condensation product of a cyclic sulfonic acid and an oil-soluble non-hydroxy alkyl amine.

9. A composition for breaking water-in-oil emulsions which comprises as a component the condensation product of a nuclear-substituted cyclic sulfonic acid an oil-soluble non-hydroxy alkyl amine.

10. A composition for breaking water-in-oil emulsions which comprises as a component the condensation product of a carbocyclic sulfonic acid and an oil-soluble non-hydroxy alkyl amine.

11. A composition for breaking water-in-oil emulsions which comprises as a component the condensation product of a nuclear-substituted carbocyclic aromatic sulfonic acid and an oil-soluble non-hydroxy alkyl amine.

12. A composition for breaking water-in-oil emulsions which comprises as a component the condensation product of a heterocyclic sulfonic acid and an oil-soluble non-hydroxy alkyl amine.

13. A composition for breaking water-in-oil emulsions which comprises as a component the condensation product of a nuclear-substituted heterocyclic sulfonic acid and an oil-soluble non-hydroxy alkyl amine.

TRUMAN B. WAYNE.

CERTIFICATE OF CORRECTION.

Patent No. 2,050,639.  August 11, 1936.

TRUMAN B. WAYNE.

It is hereby certified that error appears in the printed specification of the above numbered patent requiring correction as follows: Page 3, first column, line 39, for "quaternary" read quarternary; same page, second column, line 28, claim 7, for "wih" read with; and line 40, claim 9, after "acid" insert and; and that the said Letters Patent should be read with these corrections therein that the same may conform to the record of the case in the Patent Office.

Signed and sealed this 20th day of October, A. D. 1936.

Leslie Frazer (Seal)  Acting Commissioner of Patents.